United States Patent
Gwo

(10) Patent No.: US 6,284,085 B1
(45) Date of Patent: Sep. 4, 2001

(54) ULTRA PRECISION AND RELIABLE BONDING METHOD

(75) Inventor: Dz-Hung Gwo, Richmond, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/054,970

(22) Filed: Apr. 3, 1998

Related U.S. Application Data

(60) Provisional application No. 60/042,616, filed on Apr. 3, 1997, and provisional application No. 60/043,514, filed on Apr. 14, 1997.

(51) Int. Cl.⁷ ..................................................... B32B 31/00
(52) U.S. Cl. .................................. 156/273.7; 106/286.7; 156/3.9; 156/325; 428/420
(58) Field of Search ........................ 156/325, 273.7, 156/319; 106/286.7; 428/420

(56) References Cited

U.S. PATENT DOCUMENTS

| | | | |
|---|---|---|---|
| 3,007,832 | * 11/1961 | Milne | .................................... 156/325 |
| 3,409,198 | * 11/1968 | Peterman | ................................ 156/64 |
| 4,847,218 | 7/1989 | Schittenhelm et al. . | |
| 4,900,387 | 2/1990 | Johnson . | |
| 4,973,564 | 11/1990 | Chyung et al. . | |
| 5,296,428 | 3/1994 | Degnan et al. . | |
| 5,604,160 | 2/1997 | Warfield . | |
| 5,641,349 | 6/1997 | Koubek et al. . | |
| 5,669,997 | 9/1997 | Robbert et al. . | |

FOREIGN PATENT DOCUMENTS

| | | | |
|---|---|---|---|
| 4611996 | * 3/1971 | (JP) | ...................................... 156/319 |
| 3-255603 | * 11/1991 | (JP) | ...................................... 156/325 |
| 703514 | * 12/1979 | (SU) | .................................. 106/286.7 |

* cited by examiner

*Primary Examiner*—John J. Gallagher
(74) *Attorney, Agent, or Firm*—Lumen Intellectual Property Services

(57) ABSTRACT

The bonding of two materials through hydroxide-catalyzed hydration/dehydration is achieved at room temperature by applying hydroxide ions to at least one of the two bonding surfaces and by placing the surfaces sufficiently close to each other to form a chemical bond between them. The surfaces may be placed sufficiently close to each other by simply placing one surface on top of the other. A silicate material may also be used as a filling material to help fill gaps between the surfaces caused by surface figure mismatches. A powder of a silica-based or silica-containing material may also be used as an additional filling material. The hydroxide-catalyzed bonding method forms bonds which are not only as precise and transparent as optical contact bonds, but also as strong and reliable as high-temperature frit bonds. The hydroxide-catalyzed bonding method is also simple and inexpensive.

54 Claims, 8 Drawing Sheets

ULTRA PRECISION AND RELIABLE BONDING METHOD

RELATED APPLICATION INFORMATION

This application claims priority from provisional application Ser. No. 60/042,616 filed Apr. 3, 1997 and provisional application Ser. No. 60/043,514 filed Apr. 14, 1997. Both of these provisional applications are incorporated by reference herein.

This invention was supported by grant number NAS 839225 from NASA. The U.S. Government has certain rights in this invention.

FIELD OF THE INVENTION

This invention relates generally to the bonding of materials, and in particular to a method for bonding materials using hydroxide-catalyzed hydration and dehydration.

BACKGROUND OF THE INVENTION

The bonding of materials is critical in making high performance instruments or devices. The quality of a bonding method is judged, in dependence upon its application, in terms of the precision, the mechanical strength, the optical properties, the thermal properties, the chemical properties, and the process simplicity of the bonding. Three popular bonding methods are optical contacting, epoxy bonding, and high temperature frit bonding.

Optical contacting is a room-temperature process which employs no bonding material, and is thus suitable only for certain precision applications involving surfaces having reasonably good surface figure match. Ideally, if the bonding surfaces are thoroughly cleaned prior to bonding, the resulting interface will have low thermal noise and contain almost nothing susceptible to oxidation, photolysis, and/or pyrolysis. Optical contacting produces bonds which are generally unreliable in strength, however, due to sensitivity to surface chemical contamination (such as, by air-borne molecules) and other environmental factors (such as humidity). In addition, surface figure mismatch almost always exists to some extent. Consequently, strong chemical bonds rarely occur extensively across the interface, and voids are seen sometimes in the interface. The bonds produced by optical contacting do not consistently survive thermal shocks. Typically, optical contacting has a low first-try success rate. In case of failure, de-bonding usually degrades surface quality, and thus lowers success rate in re-bonding.

Epoxy bonding is usually a room-temperature process and has a good success rate for regular room-temperature applications. Because epoxy bonding is typically organic-based, however, the bonding is susceptible to pyrolysis (such as by high intensity lasers) and/or photolysis (such as by ultraviolet light) in high power density applications. The strength of the epoxy bond varies with temperature and chemical environment. Because the resulting wedge and thickness cannot be precisely controlled, epoxy bonding is unsuitable for precision structural work. It creates a relatively thick interface which makes optical-index matching more of a concern in optical applications.

Frit bonding is a high-temperature process which creates a high-temperature rated interface. The interface is mechanically strong and chemically resistant in most applications. Because the frit material is physically thick and thus thermally noisy, it is unsuitable for precision structural work. For example, when optimized for bonding fused silica, frit bonding usually creates good coefficient of thermal expansion (CTE) matching with the substrates at room temperature. The matching usually does not hold to a wider temperature range, however, resulting in strain and stress near the interface. Furthermore, a frit bond is opaque and inapplicable in transmission optics. Due to the high temperature requirement, frit bonding requires high-temperature rated fixturing for alignment, and is thus expensive. It is unsuitable if high temperature side effects, such as changes in the physical/chemical properties of the substrates, are of concern.

OBJECTS AND ADVANTAGES OF THE INVENTION

Accordingly, it is an object of the present invention to provide a method for producing bonds which are as precise and transparent as optical contact bonds and which also have the strength and reliability of frit bonds. It is a further object of the invention to provide such a method which may be performed simply and inexpensively at room temperature.

SUMMARY

These objects and advantages are attained by a method for bonding a first surface to a second surface through hydroxide-catalyzed hydration and dehydration. According to the method, hydroxide ions are applied to at least one of the surfaces and the surfaces are then placed sufficiently close to each other to form at least one chemical bond between the surfaces. The hydroxide ions are preferably contained in an aqueous solution which is applied to at least one of the surfaces. Suitable hydroxides for the aqueous solution include the ionic salts NaOH, KOH, $NH_4OH$, sodium ethoxide, and potassium ethoxide.

At least one of the surfaces is preferably a surface of a material that can form a silicate-like network or that can be chemically linked to a silicate-like network through hydroxide-catalyzed hydration and dehydration. Examples of materials capable of forming a silicate-like network through hydroxide-catalyzed hydration and dehydration include silica, fused silica, silicon having a surface oxide layer, natural quartz, fused quartz, ZERODUR™ glass ceramic, ultra low thermal expansion coefficient (ULE↔) glass, borosilicate, opal, granite, and other silica-based or silica-containing materials, including certain laser crystals. Examples of materials which cannot form but can be linked to a silicate-like network through hydroxide-catalyzed hydration and dehydration include alumina, alumina-based or alumina-containing materials including certain laser crystals, and iron. When hydrated, these two categories of materials both feature surface hydroxide groups.

Prior to bonding, both surfaces are preferably cleaned. If the surface figure match between the surfaces is favorable, such as in precision applications, a hydroxide solution can be employed for bonding substrate material(s) that can form silicate-like networks in situ. A solution containing both hydroxide and silicate can be used for substrate materials that cannot generate (or cannot generate at a reasonable rate) silicate-like networks through hydroxide catalysis. In all these precision applications, solutions containing both hydroxide and silicate can be used to control the settling time by adjusting their composition percentages.

If the surface figure match between the surfaces is unfavorable, such as in imprecision applications, a filling powder may be added as part of the hydroxide-containing (or also silicate-containing) bonding material to facilitate bridging the interface gap. The filling powder should be material(s) that can be hydrated to have surface hydroxyl groups, which can be chemically linked through hydroxide catalysis to a silicate network (either generated in situ from the powder material(s) and/or substrate material(s) to be bonded, or originally contained in the bonding material). In these imprecision applications, solution(s)/slurry(ies) containing hydroxide, silicate, and powder material can also be used to control the settling time by adjusting their composition percentages. Advantageously, the bonding method of the present invention may be performed at room temperature.

DETAILED DESCRIPTION

Principles

The reactions of hydration and dehydration can be described by the following chemical equation:

  (1)

where X and Y are symbols of chemical elements or chemical structures. The forward reaction is hydration, and the reverse reaction is dehydration. When X and Y represent the same chemical element or structure, Eq. (1) becomes:

  (2)

The hydration and dehydration processes described by Eqs.(1) and (2) can be catalyzed by H+, OH—, and/or Group IA metal ions. In the absence of any catalyst, the activation energy $E_a$ of the dehydration process ranges from few to several eV, depending on X and Y. Using a hydroxide catalyst, $E_a$ can be lowered in some cases to less than a few $k_B T$ where $k_B$ is Boltzmann's constant and T the temperature in degrees Kelvin. Therefore, the hydration and dehydration processes can readily occur at room temperature through hydroxide catalysis. For example, the hydroxide can be in the form of aqueous solutions of ionic salts such as NaOH, KOH, NH$_4$OH, sodium ethoxide, potassium ethoxide, etc., each of which provides hydroxide ions in aqueous solution.

In the case of a single surface, hydration and dehydration occur, as described by Eq.(2), with both elements or structures X on the same substrate surface. More specifically, for a single fused-silica surface, the equation for hydration and dehydration under hydroxide catalysis becomes:

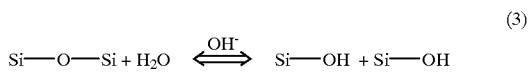

Figure 1:
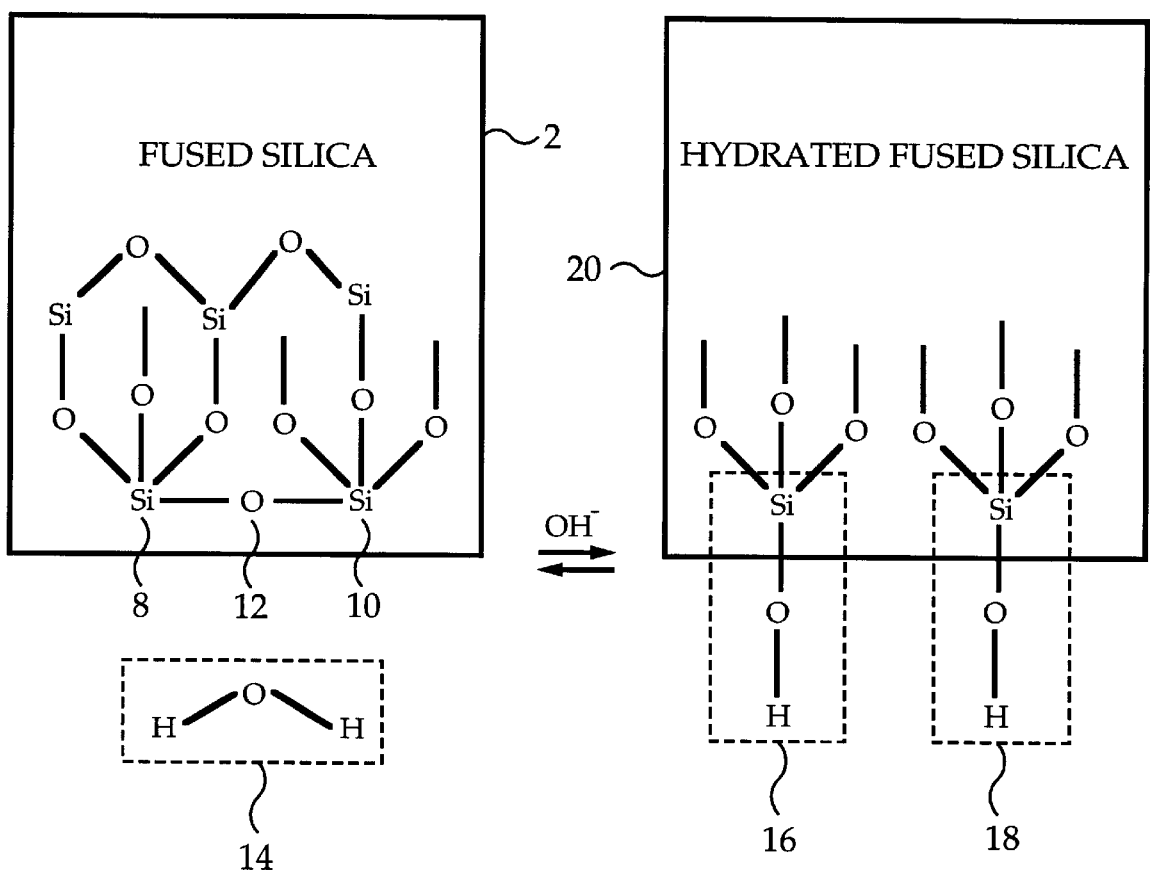
FIG. 1 is a schematic diagram illustrating the concept of hydration and dehydration of a single surface.

As illustrated in FIG. 1, fused silica 2 comprises a network of siloxane bridges (viz. Si—O—Si) in bulk. When fused silica 2 is exposed to H$_2$O and OH—, silicon atoms 8 and 10 and oxygen atom 12 can be hydrated by water molecule 14 to form two Si—O—H structural groups 16 and 18.

Similar reactions can occur to a limited extent on an alumina surface according to the following equation:

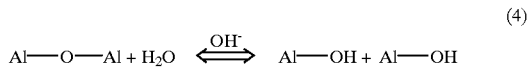

Figure 2A:
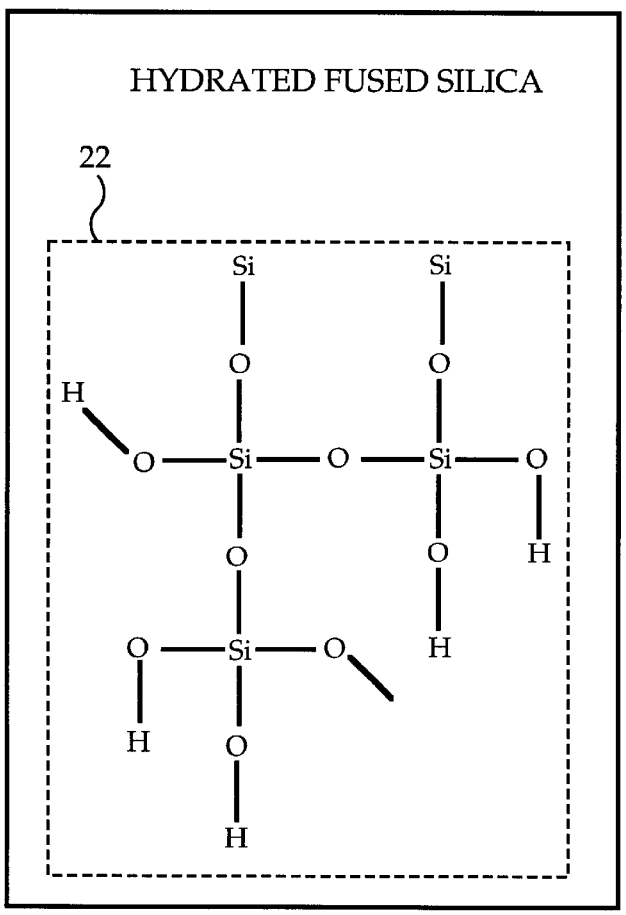
FIG. 2A is a schematic diagram illustrating a material that forms a silicate-like network through hydroxide-catalyzed hydration and dehydration.
Figure 2B:
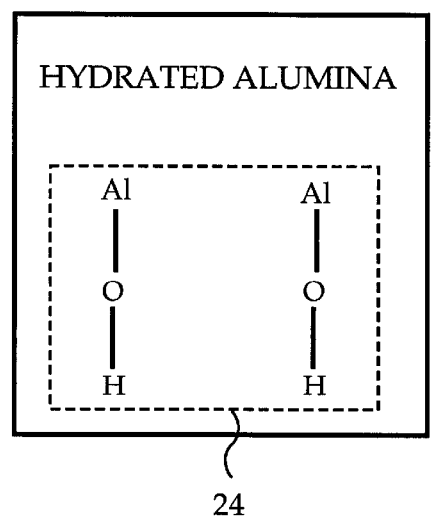
FIG. 2B is a schematic diagram illustrating a material that can be chemically linked to a silicate-like network through hydroxide-catalyzed hydration and dehydration.

Referring to FIGS. 2A–2B, one difference between fused silica and alumina is that fused silica can form a relatively thick three dimensional silicate-like network 22, as shown in FIG. 2A, through hydroxide-catalyzed hydration/dehydration. Alumina, however, can form in most cases only a quasi-two-dimensional layer 24 of Al—O—H structures on its surface, as shown in FIG. 2B. A quasi-two-dimensional layer is defined as a structure whose dimension perpendicular to the bonding surface is much smaller than its other two dimensions parallel to the bonding surface.

Figure 3A:
FIGS. 3A–3C are schematic diagrams showing the bonding of two surfaces through hydroxide-catalyzed hydration and dehydration according to a preferred embodiment of the present invention.
Figure 3A:
Figure 3B:
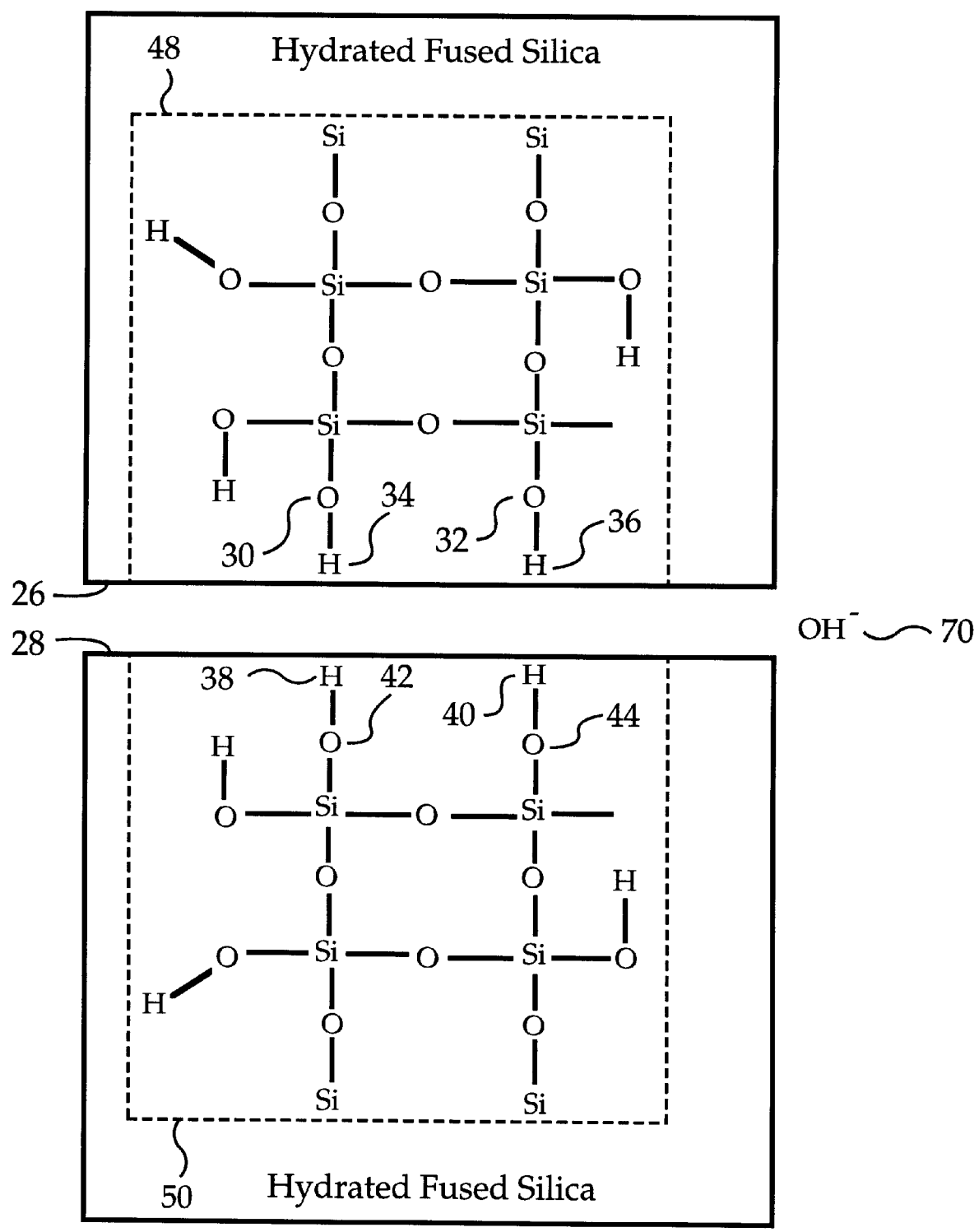
Figure 3C:
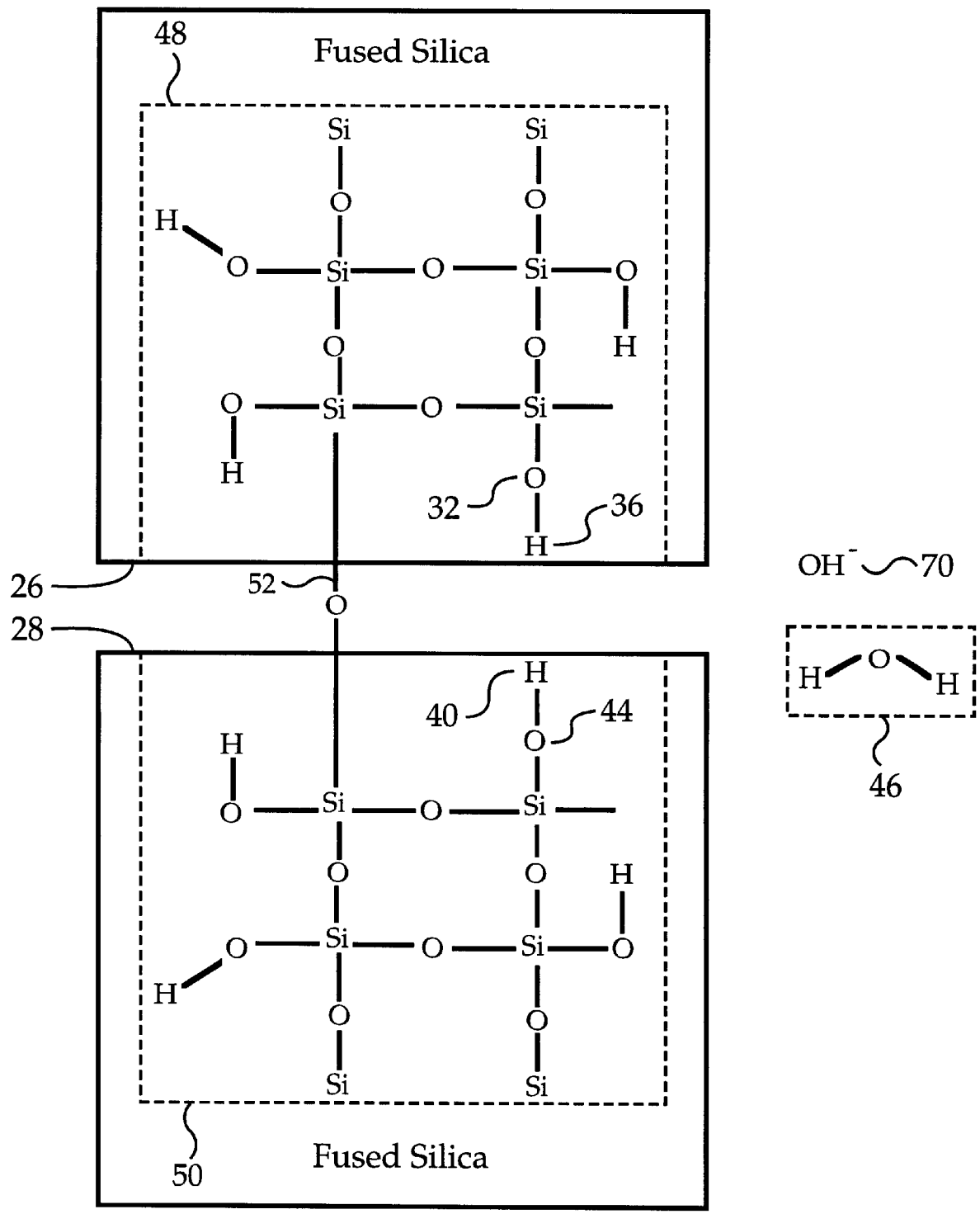

As shown in FIGS. 3A–3C, if fused-silica having surfaces 26 and 28 are exposed to water and a hydroxide ion 70, and if surfaces 26 and 28 are then placed sufficiently parallel and close to each other, chemical bonding can occur between them through hydroxide-catalyzed hydration and dehydration. FIGS. 3A and 3B depict surfaces 26 and 28 of fused silica before and after surface hydration, respectively.

Referring to FIG. 3B, if only surface 26 and its associated silicate-like network 48 were present during the subsequent dehydration, one oxygen atom and two hydrogen atoms would be removed from the group of oxygen atoms 30 and 32 and hydrogen atoms 34 and 36 to form a water molecule, if sterically favorable. As shown in FIG. 3C, however, if both surfaces 26 and 28 (and thus their associated silicate-like networks 48 and 50) are present, one oxygen atom and two hydrogen atoms from oxygen atoms 30 and 42 and hydrogen atoms 34 and 38 are released as water molecule 46, resulting in chemical linking of the surfaces, namely siloxane bridge 52. When such chemical bonding occurs extensively, surfaces 26 and 28 are bonded together with great strength.

Figure 4:
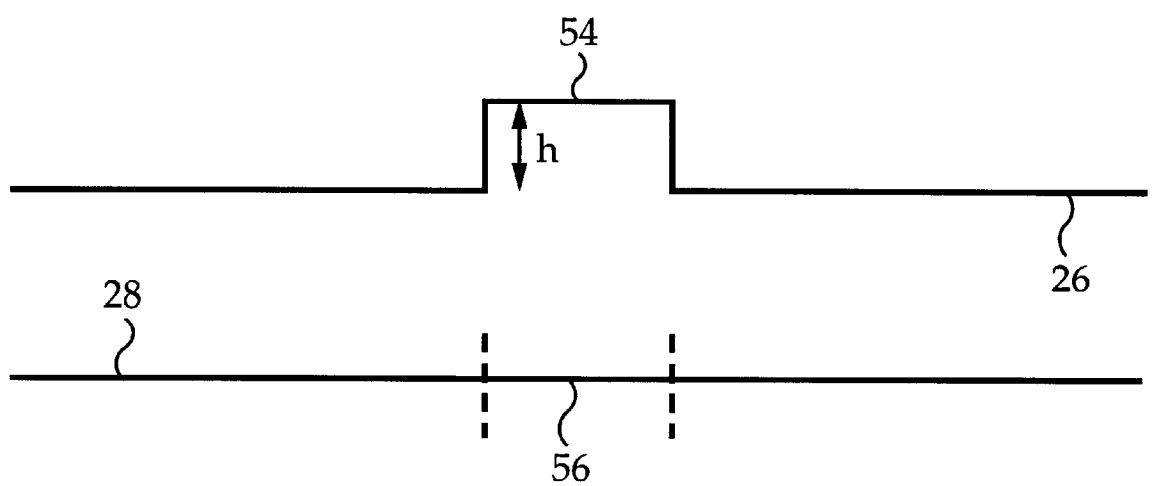
FIG. 4 is a schematic diagram illustrating a surface figure mismatch.

The requirement that the surfaces 26 and 28 be close enough to form bond 52 will now be discussed in more detail. If surfaces 26 and 28 are flat, this requirement is met by simply placing the surfaces against each other. In reality, however, there is almost always surface figure mismatch, as schematically illustrated in FIG. 4. Regardless of how close surfaces 26 and 28 are to each other, region 54 of surface 26 is at least a distance h away from region 56 of surface 28. If distance h is small, the three dimensional silicate-like networks generated from surfaces 26 and 28 through hydroxide-catalyzed hydration can then fill the gap between regions 54 and 56.

Figure 5A:
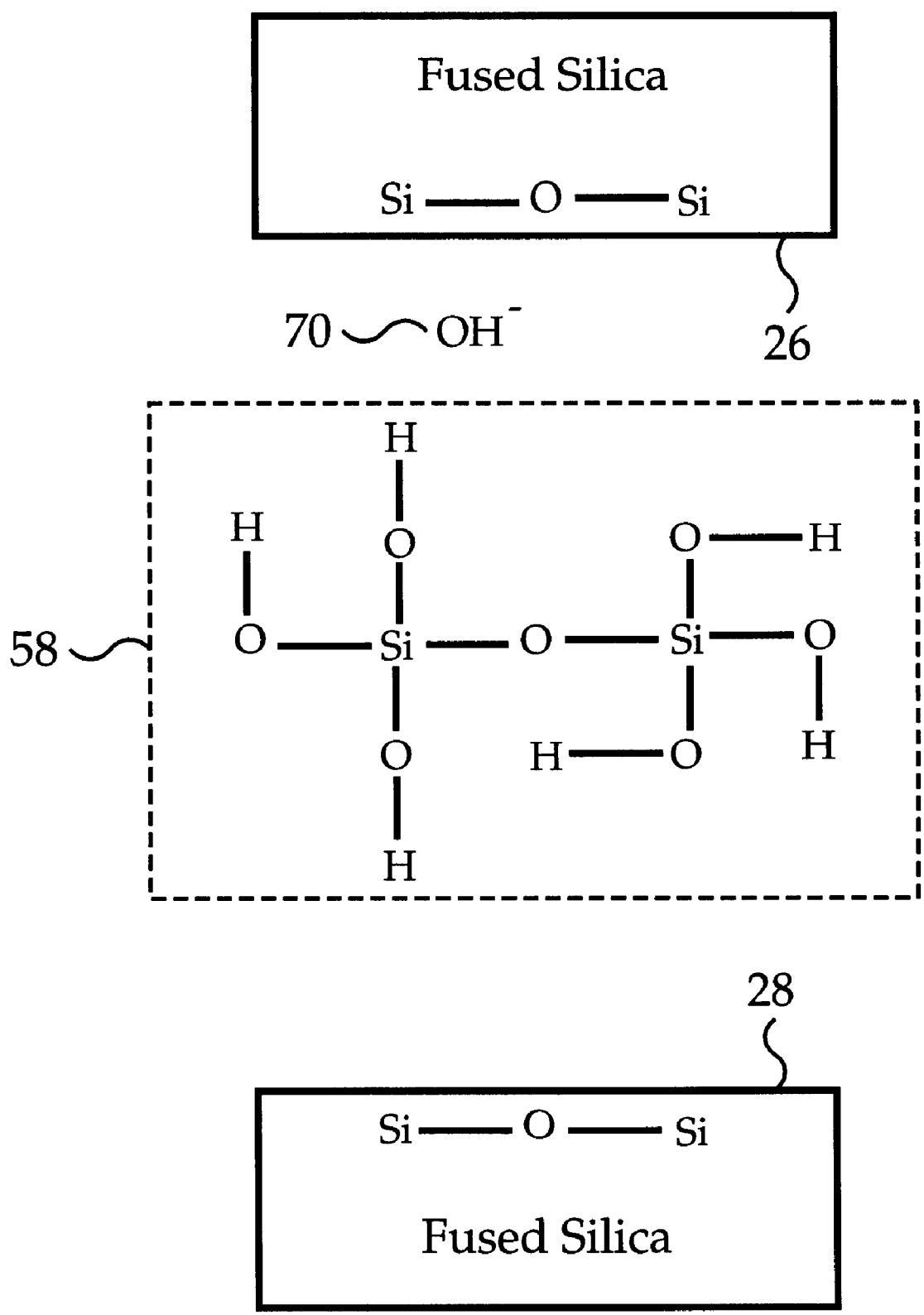
FIGS. 5A–5B are schematic diagrams illustrating the use of a silicate material as a filling material between bonding surfaces.

However, the in situ generation rate of the silicate-like network could be too slow to fill the gap within a reasonable period of time. Therefore, an alternative approach is to add a silicate material 58 as part of the hydroxide bonding material, as shown in FIG. 5A. The silicate material used here is preferably silicon dioxide dissolved in a high-pH aqueous solution. Alternatively, it can be in the form of high-pH aqueous solution of silicate salt(s). The bonding can be conducted as follows: (a) apply the bonding material (containing silicate 58 and hydroxide ions 70) to either or both surfaces 26 and 28; and (b) bring the two bonding surfaces 26 and 28 face-to-face against each other.

Figure 5B:
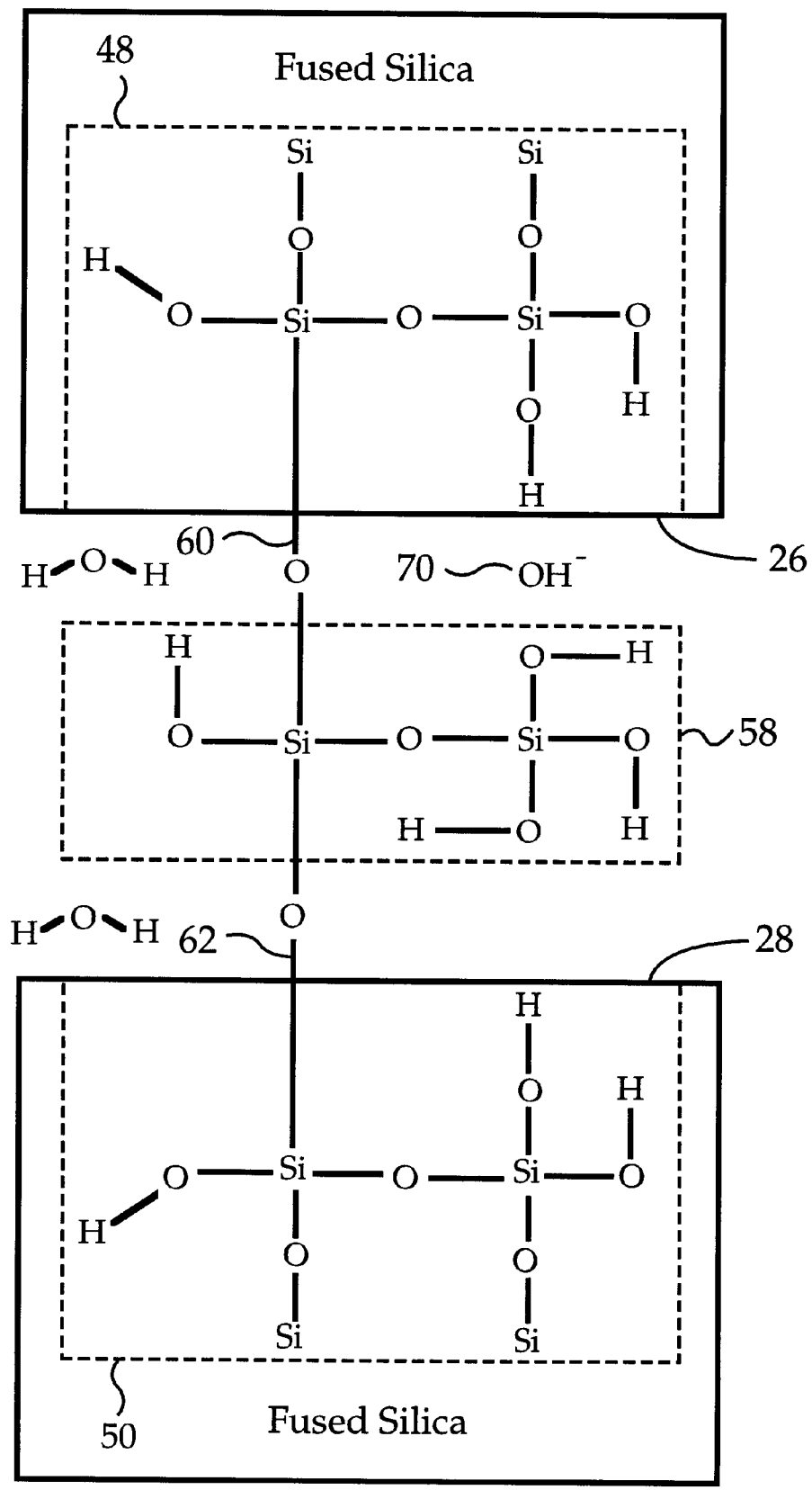

As shown in FIG. 5B, silicate 58 and surfaces 26 and 28 are hydrated with the aid of hydroxide ions 70. Chemical bond 60 between silicate-like network 48 and silicate 58 is then formed through hydroxide-catalyzed dehydration. Similarly, chemical bond 62 is created between silicate-like network 50 and silicate 58. When such chemical bonding occurs extensively across the interface, surfaces 26 and 28 are bonded together with great strength.

We may categorize the precision bonding of the present invention into three cases as follows:

Case I: to bond material(s) that can generate silicate-like network(s) through hydroxide-catalysis, the application of the silicate material is optional if the surface figure mismatch is small. The application of the silicate material matters only for controlling the settling time during the bonding process. The more silicate, the shorter the settling time. Here, the settling time refers to the time needed for the bonding to become so strong that it is impossible to shear or split the bonding manually without leaving tenacious bonding material residue and/or permanent surface damage. However, when the mismatch is too large for the silicate-like network(s) generated from the substrate material(s) to fill, it is necessary to add silicate as part of the bonding material. Substrate materials of this category include silicon with a surface oxide layer, natural quartz, fused quartz, fused silica, ZERODUR™ glass ceramic, ULE↔, borosilicate, opal, granite, other silica-based or silica-containing materials (such as certain laser crystals), etc. The above conclusion about adding silicate is also applicable to bonding identical or different materials, for example, borosilicate to borosilicate, fused-quartz to fused-silica, ULE↔ to ZERODUR™ glass ceramic, etc. ULEE has a composition of about 92.5% silicon dioxide and about 7.5% titanium dioxide. ZERODURE↔ (Schott Glass Technologies, Inc., Duryea, Pa.) has the following composition (%): silica 35–75, sodium oxide <1, zinc oxide 1–10, aluminum oxide 20–50, titanium oxide 1–10, zirconium oxide 1–10, arsenic trioxide <1, lithium oxide 1–10, magnesium oxide 1–10, and phosphoric pentoxide 1–10.

Case II: For bonding a material that can generate a silicate-like network to a material that can generate a quasi-two-dimensional layer of surface chemical groups X—O—H through hydroxide-catalysis, the above conclusion about adding silicate is still valid. One difference is that, with only one surface capable of generating a silicate-like network, it takes longer to fill an identical interface gap. Again, when the mismatch is sufficiently small and the silicate-like network generated in situ is adequate, the application of a silicate material is optional. Examples of materials that can generate a quasi-two-dimensional layer of X—O—H structures include alumina (such as, sapphire), alumina-based materials (such as, certain laser crystals), iron, etc.

Case III: To bond material(s) that can generate a quasi-two-dimensional layer of X—O—H structures, it is almost always necessary to include silicate as part of the bonding material since the materials are generally unlikely to have surface figure match take place at an atomic scale globally.

In summary, if the surface figure match is favorable, such as in precision applications, hydroxide solutions can be employed for substrate material(s) that can form silicate-like networks in situ. Solution(s) containing both hydroxide and silicate can be used for substrate material(s) that either cannot generate (or cannot generate at a reasonable rate) silicate-like networks through hydroxide catalysis. If the surface figure mismatch is seriously unfavorable, such as in non-precision (imprecision) applications, a filling powder may be added as part of the hydroxide-containing (or also silicate-containing) bonding material to facilitate bridging the gap. The filling powder should be material(s) having surface hydroxyl groups which can be chemically linked through hydroxide catalysis to a silicate network (either generated in situ from the powder material(s) and/or substrate material(s) to be bonded, or originally contained in the bonding material).

As a generalization, multiple hydroxides, instead of a single hydroxide, can be applied as catalysts. Similarly, multiple silicate materials and/or multiple powder materials can be employed. Such variations in bonding material(s) provide flexibility in fine tuning the physical and/or chemical properties of the bonding for specific applications.

Processes & Embodiments

In precision bonding, global surface figure match is far more important than microroughness unless other considerations, such as light scattering loss, are of concern. In fact, the bonding between an optical-quality surface and a fine-ground surface, as well as the bonding between two fine-ground surfaces, have both been successfully demonstrated using the bonding method of the present invention. The maximum possible build up of the interface bonding material depends on both the substrate material(s) and the bonding material. In precision bonding of fused silica using aqueous solution of hydroxide, it is approximately up to sub-micro-meter. In precision bonding of fused silica using aqueous solution containing both hydroxide and silicate, it is approximately up to one micro-meter. These facts imply the corresponding requirements on the bonding-surface figures. Of course, when powder material is added, there is no problem building the interface thickness up to sub-millimeter range.

To maximize the success rate, it is preferable to conduct the bonding process in a clean environment, such as a cleanroom, and to clean the bonding surfaces as well as any equipment involved prior to bonding. The bonding surface cleaning can maximize the intrinsic surface hydrophilicity, minimize the surface hydrophobicity (such as, that caused by certain organic and/or silicone contamination), as well as minimize surface particulate contamination. In general, the surface chemical cleanliness is less critical than that required by optical contacting. The cleaning can be conducted using standard or general appropriate industrial practice, depending on the substrate material(s) and targeted contaminant(s). Examples are solvent rinsing, solvent touch-off, ultrasonic cleaning, deionized-air cleaning, $CO_2$-snow cleaning, spin cleaning with various cleaning agent(s) and/or solvent(s), RCA cleaning, and appropriate combinations of these cleaning techniques. In most uncritical cases, the final visual inspection for surface particulate can be quickly done with the help of strong oblique illumination of visible light, free of or extremely low in infrared which could heat up and thus warp the substrate(s).

Although the general bonding method according to the present invention has been demonstrated for various materials, the following discussion on specific examples will be mainly focused on precision bonding of fused silica as a preferred embodiment of the invention.

For fused-silica, the minimum required volume of the bonding material is approximately 50 nano-liters per square centimeter when the volume loss to the chamfer area due to the capillary effect is negligible. If the amount is too little, there could be a risk of premature bonding caused by inadvertent optical contacting before proper alignment is achieved. Although excess volume does not degrade the bonding performance, it might leave residues around the edge of the interface.

EXAMPLE I

Two fused-silica disks with flat and polished (to better than $\lambda/4$ peak-to-valley with $\lambda$=633 nm) 2.5-cm o.d. circular bonding surfaces can be bonded in a Class 100 clean environment at room temperature. The bonding material can be a pure aqueous solution of KOH with a $KOH:H_2O$ molecular ratio equal to 1:500. Here, it is preferable to use deionized water and conduct solution filtration, for example, with a filter element of 0.2 micro-meter or finer such that the surface figures still dominate the interface thickness and wedging. The solution can be pipetted to one of the two surfaces with a volume between 0.3 and 1.0 cubic millimeter. The two surfaces are then placed against each other to allow the capillary effect to spread out the solution uniformly and to allow gravity to hold the upper piece against the lower one. In this specific case, the settling time is approximately 30 minutes, which is normally long enough for any precision optical alignment if needed.

EXAMPLE II

For the aforementioned silica-to-silica bonding, alternatively, an aqueous solution of NaOH and silicate with the $NaOH:SiO_2:H_2O$ molecular ratio equal to 1:1.3:57 can be used. It is suggested that the bonding solution be centrifuged, and only its upper portion be used in further solution filtration. Otherwise, the bonding can be conducted in a similar way. The corresponding settling time becomes as short as a few tens of seconds. This fact implies the settling time can be changed by adjusting the concentrations of the hydroxide and silicate (with the exception that a bonding solution saturated or nearly saturated with a hydroxide, particularly NaOH, occasionally does not work properly).

Some commonalties between Examples I and II are as follows: They both have excellent success rate (>99%) in terms of creating 100% bonding coverage. A few days after the bonding, the bonded assemblies can be safely handled in a regular laboratory environment. Approximately one week after the bonding, the bonded assemblies can survive violent glass machining, such as wet drilling. They both reach their highest strengths on the order of several thousand psi (pounds per square-inch) after approximately one month of curing.

For the two aforementioned examples, NaOH may be employed as a substitute for KOH. Some differences between the options of NaOH and KOH as applied to fused silica or fused quartz are as follows:
(1) Bonding resulting from KOH is expected to have a higher temperature rating.
(2) KOH is less aggressive in terms of hydration than NaOH. Therefore, KOH provides higher recoverability for bonding surfaces in case de-bonding is necessary, for example, when misalignment occurs before the bonding settles.
(3) KOH generally results in higher mechanical bonding strength.
(4) After the bonding is cured, excess pure KOH solution generally causes no particulate residue in the chamfer around the interface. However, excess NaOH solution (and solutions containing certain silicates) sometimes do.

Other than pipetting, there are many ways of dispensing bonding material(s) to bonding surfaces, such as atomization (aerosol), spin coating, etc. Of course, the dispensing of the bonding material can also be made with both substrates and thus the interface can be immersed in the bonding solution if needed. When pipetting is chosen, the actual number of drops and their locations should be determined by the interface area as well as interface geometry. The interface geometry affects the volume loss at the chamfer due to the capillary effect. However, the capillary effect helps spread out the bonding solution when the two surfaces are face-to-face and gently in contact. Therefore, the locations of these drops should be chosen such that there is no air gap trapped in the interface in the end.

It is preferable to have the interface essentially parallel to the ground in the bonding process. In most cases, to avoid premature bonding, such as inadvertent optical contacting, no force other than the gravity weight of the upper part is employed. However, when the upper part is asymmetric and/or light, extra balancing force is sometimes needed to ensure the interface is free of wedging caused by surface tension during the settling/curing process. Otherwise, it could lead to imperfect bonding coverage. In general, it is a good practice to do the lateral (relative to the normal of the interface) alignment with fixturing prior to the bonding process. During this pre-bonding alignment, inadvertent optical contacting can be prevented by shimming the two parts with uniform shim stock, polymer thin film, etc., which do not leave contaminating residue.

Most precision bonding tests on various substrate materials have been performed in a Class-100 clean environment. The bonding surfaces have created typically sub-micron surface-figure mismatch over interface areas ranging from a few square millimeters to ~400 square centimeters. In precision bonding, the interface thickness which the silicate material can build has been so far limited by the surface figures and the filter element used in the solution preparation. The upper bound of the minimum interface thickness was approximately 10 nanometers, as determined by the resolution of the scanning electron microscope employed to verify the bonding profile.

For imprecision bonding, although a clean environment might be unnecessary, it is still important to ensure the bonding surfaces are chemically clean to maximize the efficiency of the chemical mechanism. Generally, a powder should be part of the bonding material to maximize the fill factor and to facilitate bridging the interface gap. The viscous slurry type of bonding material can be prepared, for example, as follows: (a) create the filling powder, for example, out of fused silica, fused quartz, or borosilicate; (b) wet the powder with small amount of deionized water; (c) mechanically agitate, centrifuge, and/or heat the wetted powder to minimize trapped air bubbles; and (d) immediately before the final bonding material is needed, add an appropriate solution of hydroxide, or of both hydroxide and silicate, to make the slurry as viscous as regular epoxies. Then apply the resulting viscous slurry bonding material to the bonding interface as viscous epoxies.

Three to four days after the bonding, the bonded assembly may be optionally baked for several hours within a microwave oven. For example, baking in a 700W, 2.45 GHz household system roughly doubles the curing speed. Of course, if metal and/or semiconductor substrate(s) are involved, they should be electrically grounded during the baking. Usually, baking too early could cause an air gap to be trapped in the interface. Other conventional baking methods such as vacuum baking may also be used if the advantages of using microwave, such as creating zero-temperature gradient across the interface to minimize thermal stress, are unimportant. Although most of the given examples are related to fused silica, the bonding method according to the invention has been successfully demonstrated for various other materials, such as fused quartz, sapphire, borosilicate, ZERODUR™, YAG laser crystals, etc., either in a homo- or hetero-configuration.

Properties & Advantages

The hydroxide-catalyzed bonding technique of the present invention is superior in many aspects to optical contacting, epoxy bonding, and high-temperature frit bonding. It essentially has all of the advantages of these common approaches and avoids nearly all of their problems.

The hydroxide-catalyzed bonding for fused silica, as an example, has the following primary advantages:

(1) The mechanical shearing-strength measurement made on the hydroxide catalyzed bonding always resulted in tearing the bulk materials. In other words, its mechanical strength is close to that of fused silica. When an aqueous KOH solution with a $KOH:H_2O$ molecular ratio of 1:500 was employed, the measured nominal shear strength was higher than 4000 psi.

(2) The hydroxide-catalyzed bonding technique is more reliable than optical contacting. The relative uncertainty in bonding strength is much smaller than that obtained from optical contacting. The hydroxide-catalyzed bonding technique is not only less demanding in surface requirements, but also more repeatable than optical contacting in performance of almost all aspects, including bonding coverage and strength.

(3) The hydroxide-catalyzed bonding can tolerate a wide temperature range, at least from 2_K up to 423_K. The bonding also survived 20 K/minute cool-down from room temperature to 77 K and 100 K/hour cool-down from room temperature to near liquid-helium temperature.

(4) The hydroxide-catalyzed bonding technique of the invention is a room temperature and low-cost process with extremely high first-try success rate in both precision and imprecision applications. It avoids all side effects related to high-temperature treatments.

(5) The settling time and the bonding reversibility are adjustable through the composition and the dispensing method of the hydroxide-catalyzed bonding solution. The length of the settling time can be varied from a few tens of seconds to about 40 minutes. In case of failure, such as misalignment, even a week after the bonding is made, the bonding surfaces are still recoverable for re-bonding.

(6) The interface thickness of the hydroxide-catalyzed bonding can be made less than 10 nanometers for precision applications and can be made as much as a few tenths of a millimeter for imprecision applications.

(7) The hydroxide-catalyzed bonding interface creates no detectable optical and/or mechanical distortion from room temperature to near liquid-helium temperatures as verified with Fizeau interferometry.

(8) The hydroxide-catalyzed bonding interface is transparent in at least the visible and infrared range, while frit bonding is opaque.

(9) The hydroxide-catalyzed bonding shows no degradation in strength and optical quality during accelerated life tests corresponding to over five years of aging.

(10) The hydroxide-catalyzed bonding has negligibly small outgassing for ultra high vacuum applications.

(11) The hydroxide-catalyzed bonding shows negligibly small magnetic contamination, even in perhaps the most magnetic-sensitive applications such as Gravity Probe-B.

(12) The hydroxide-catalyzed bonding is water resistant, and thus robust, in humid or under-water environments.

(13) The hydroxide-catalyzed bonding is essentially chemically inert. It can survive a wide pH range, at least from aqua regia to pH14. Various organic solvents have no impact on the bonding quality.

Applications

There are many demonstrated and potential applications for the bonding technique according to the present invention.

(1) Bonding of a wide variety of materials whose surfaces have hydroxyl (—OH) groups or whose surfaces can be hydrated (with the aid of a hydroxide or hydroxides) to generate hydroxyl groups. These materials include silica-based and silica-containing materials such as natural quartz, fused quartz, fused silica, borosilicate, ZERODUR™, glass ceramic, ULE↔, opal, granite, etc. These materials also include alumina-based and alumina-containing materials such as sapphire and (Yttrium Aluminum Garnet ($Y_3Al_5O_{12}$). Also included are semiconductors such as silicon whose natural or thermally grown surface oxide is typically terminated or can be terminated with hydroxyl groups, metals such as stainless steel and aluminum, ceramics that have a sufficiently high density of surface hydroxyl groups, superconductors that have a sufficiently high density of surface hydroxyl groups, and many laser crystals.

(2) General optical applications.

The bonding interface of the invention is essentially transparent at least in the visible region. Since the typical interface thickness is only a small fraction of the wavelength in the visible region, its absorption in the regions of longer wavelengths such as the infrared region should be negligible as well. Optical index matching is basically no longer an issue. Furthermore, since the bonding interface consists only of inorganic materials, it is insensitive to ultra-violet (UV) photolysis, which could result in weakening and/or blackening certain organic-material-based optical epoxies. As a substitute for epoxy bonding, the hydroxide-catalyzed bonding technique is applicable in fabricating refractive and/or transmissive assemblies such as doublet and triplet lenses and other optical systems such as silicon infrared optics and ZERODUR™ laser ring gyroscopes used for navigation.

The general optical applications of the hydroxide-catalyzed bonding technique were demonstrated by the Stanford/NASA Gravity Probe-B star tracking telescope, one of the most accurate and precise optical instruments ever made. It required bonding for both reflective and refractive optical elements. The reflective optical elements included mirrors and reflective beam-splitters. The refractive optical elements included lenses and refractive beam-splitters. As a special example, a surface of fused quartz or fused silica was reliably bonded to an anti-reflection coating with a thin silicon-oxide overcoat.

(3) High optical-power density and/or laser applications.

Since the bonding interface consists only of inorganic materials that cannot be oxidized or pyrolyzed by high power heat dissipation, the applications of the hydroxide-catalyzed bonding technique in refractive, transmissive, and/or diffractive assemblies or systems can result in extremely high damage threshold in terms of power density. Typical examples of the applications include bonding laser crystals and fabricating laser optics such as doublet lenses, triplet lenses, output coupler optics, gas-laser tube assemblies, and optical resonators. Currently these component lenses are bonded together by UV-cured synthetic polyester or other organic-based index-matching epoxies, which are usually problematic.

Another advantage of applying the hydroxide-catalyzed bonding technique in combining laser crystals is to maximize physical dimensions of the laser and optical amplifier active medium and therefore maximize the output power. Since the bonding of undoped Yttrium Aluminum Garnet ($Y_3Al_5O_{12}$) host material was already demonstrated, it will be an obvious extension to bond doped laser crystals such as Neodymium:YAG and Ytterbium:YAG. Some other examples of laser crystals that can be bonded by the new bonding technique are as follows:

$Ca_2Al_2SiO_7$
$Gd_3SC_2Al_3O_{12}$
$Y_3Sc_2Al_3O_{12}$
$CaY_4(SiO_4)_3O$
$Be_3Al_2Si_6O_{18}$
$Y_{3-x}Yb_xAl_5O_{12}$
$Nd_xY_{1-x}Al_3(BO_3)_4$
$La_{131\ x}Nd_xMgAl_{11}O_{19}$
$Sr_{1-x}Nd_xMg_xAl_{12-x}O_{19}$
$YAlO_3$
$BeAl_2O_4$
$Mg_2SiO_4$
$Y_3Fe_5O_{12}$
$Lu_3Al_5O_{12}$

For another example, the hydroxide-catalyzed bonding technique can also be used to bond a doped and undoped laser crystal to minimize dimensional changes of the doped crystal caused by thermal loading due to high power optical pumping.

(4) Classical precision applications.

It was demonstrated that the bonding interface can be made thinner than 10 nanometers, as measured by a scanning electron microscope (SEM) with approximately 10-nanometer resolution. Such interface thickness is optically thin in terms of optical-path length, electrically thin in terms of electrical conductivity, and thermally thin in terms of thermal conductivity. Moreover, the bonding interface is transparent. Therefore, in precision optical applications, the hydroxide-catalyzed bonding technique would cause no problem in optical index matching. For almost all conceivable classical precision optical and/or mechanical applications, the hydroxide-catalyzed bonding technique would cause essentially no problem in interface wedging.

As shown by the Gravity Probe-B Space Telescope, all interface wedges are well below 1 arc-sec, mostly limited by surface particulate contamination and surface figure mismatch. The settling time for the hydroxide-catalyzed bonding technique is adjustable by varying the chemistry and the dispensing method of bonding materials, and it is typically long enough for ultra-precision alignment, as demonstrated in the assembly work of Gravity Probe-B. The hydroxide-catalyzed bonding technique can potentially be used to splice silica optical fibers, fabricate precision glass supports for X-ray micro-lithograph masks, and assemble precision mini- or microscopic (and certainly macroscopic) plumbing systems.

(5) Micro-fabrications.

The bonding interface profile, in terms of physical thickness, thermal conductivity, electrical conductivity, and optical transmissivity, can be controlled through bonding material and its dispensing methods. The hydroxide-catalyzed bonding technique can thus be applied to micro-fabrications using various materials, including insulators (such as various optical materials), semiconductors, metals, ceramic, and superconductors. Since the bonding can be made extremely thin, the hydroxide-catalyzed bonding technique can be used to combine small structures, such as mechanical, optical, acoustic, electronic, electrical elements, with dimensions down to sub-micron.

The hydroxide-catalyzed bonding technique can thus help construct nanometer-scale objects through assembling microscopic devices. It may be used to create new mini-, mesoscopic, and microscopic devices and systems for optical, mechanical, thermal, acoustic, and electronic applications. The microscopic devices include those featuring homo-structures, such as metal-insulator-metal, semiconductor-insulator-semiconductor, superconductor-insulator-superconductor layers, and/or those featuring hetero-structures, such as semiconductor-insulator-superconductor layers, with the insulator layer created by the bonding material with or without other insulating material(s) involved. Here, the superconductor-insulator-superconductor layer is intriguing for its quantum tunneling effects.

Another application of the hydroxide-catalyzed bonding technique is in fabricating various microscopic systems and devices, such as an accelerometer, thermometer, calorimeter, pressure sensor, acoustic sensor (microphone), etc. Another potential application of the hydroxide-catalyzed bonding technique is to help fabricate flat-panel-display thin-film transistors.

(6) High-mechanical-strength applications.

Typical shear strength of the bonding according to the present invention ranges from a few thousand psi up to several thousand psi, depending on the substrate material(s) and surface figure mismatches. For example, the shear bonding strength between fused-silica and fused-silica can reach 4100 psi, which is about 60% of the tensile strength of the bulk material, and the shearing usually results in fractures propagating into the bulk materials, instead of clean cleavage along the original interface. The bonding between fused-quartz and fused-quartz passed NASA's stringent vibrational testing for space vehicle launching, as demonstrated by the fused-quartz Gravity Probe-B science instrument assembly, which has more than 40 bonding interfaces. In general, this hydroxide-catalyzed bonding technique is an excellent substitute for high-temperature frit bonding and optical contacting for structural or mechanical purposes.

(7) Extremely low thermal-noise applications.

For many ground-based laser-interferometric gravity-wave observatories around the world, such as GEO-600 in UK and LIGO of CalTech and MIT, the hydroxide-catalyzed bonding technique has been the best choice to interface a large mirror substrate and its glass fiber-suspension system, in terms not only of mechanical strength, but also of extremely low thermal noise. The thermal noise of the bonding is currently beyond detection by state-of-the-art techniques.

(8) Applications in space.

The applications in space of the hydroxide-catalyzed bonding technique were demonstrated by the testing program of the Stanford/NASA Gravity Probe-B space telescope. The bonding meets the requirements on tolerance to launch load, cosmic rays, etc. For the Next Generation Space Telescope (NGST), this hydroxide-catalyzed bonding method has been considered one of the best bonding schemes to integrate the six-meter diameter floppy meniscus borosilicate mirror substrate with hundreds of borosilicate "buttons" used for mirror figure dynamic control.

(9) Applications with or without high thermal stress in cryogenic and high-temperature environments.

The bonding according to the present invention can survive at least over the temperature range from 2_K to 423_K. It can also survive a large temperature gradient across the bonding interface. For example, for two 1 cm thick fused-silica disks bonded together, with one piece immersed in liquid nitrogen up to the bonding interface level, heating the top piece to 50° C. has no degrading effects on the bonding. With substrates and interface dimensions varying from a few millimeters to a few tens of centimeters, the bonding can tolerate 20 K/minute cool-down to liquid nitrogen temperature and 100 K/hour cool-down to around 4 K. This new bonding method was successfully tested for the fused-quartz instrument of the Gravity Probe-B that is going to be operated at 2.5 K in space, and is being considered for bonding borosilicate parts in NGST, which is to be operated at 35 K. The hydroxide-catalyzed bonding technique can potentially be used to assemble precision silicon X-ray optics assemblies and systems which need to tolerate steep temperature gradient when used in a synchrotron radiation beam line.

(10) Under-water applications.

The bonding according to the present invention survived in aqueous solutions with a wide range of pH values. No degradation was observed after 10 hours of immersion in aqua regia or after 215 hours of immersion in a pH14 solution.

Although the original bonding solution is aqueous, the immersion into water actually makes the bonding more water resistant because of the dissolution and loss of the hydroxide catalyst. Hermetic sealing against water was also demonstrated.

(11) Applications in chemistry and chemical engineering.

The bonding material is essentially chemically inert. It can survive not only over an extremely wide pH range but also all commonly used organic solvents ever tested, such as methanol, ethanol, acetone, benzene, etc. with no degradation in bonding quality. Its application can be extended to a wide variety of polar, non-polar, protic, aprotic, organic and/or inorganic solvents. Hermetic sealing was also demonstrated in all tested cases. Therefore, the hydroxide-catalyzed bonding technique can be employed to fabricate fluid, gas and/or liquid transfer systems and containers of various dimensions for chemistry and chemical engineering.

Furthermore, the hydroxide-catalyzed bonding technique can be used to enhance adhesion between a relatively viscous material and a solid substrate, or between two viscous materials. The viscous material may serve as lubricant and/or paint for chemical/mechanical protection or as a coating for chemical, optical, thermal, acoustic, electronic purposes. For example, the hydroxide-catalyzed bonding technique can help maximize lubricant adhesion on computer hard disks to reduce the risk of mechanical damages due to contacts with the read/write head. For another example, when its adhesion is enhanced by the hydroxide-catalyzed bonding technique, the coating on the inner surface of a chemical plumbing system may help further reduce the corrosion rate. This kind of adhesion can also improve the life time of any high-temperature rated lubricants, such as non-carbon based polymers with —OH groups, for engine inner surfaces.

(12) Vacuum applications.

Since the hydroxide-catalyzed bonding results in hermetic sealing, it can be used for vacuum sealing. The only outgassing material from the bonding interface is water molecules, with all other molecular species beyond detection by state-of-the-art techniques. The water content can be reduced through baking and/or vacuum pumping. According to Le Chatelier's principle, the loss of water results in more chemical bonds across the bonding interface and thus leads to even stronger bonding and better sealing. The application of the new bonding technique in ultra-high vacuum systems was already demonstrated. The new bonding technique can also be employed to fabricate vacuum feed-throughs, assemblies, systems, etc.

(13) Applications in jewelry.

The hydroxide-catalyzed bonding can be employed to put precious and/or semi-precious stones together either in a homo-crystalline or hetero-crystalline configuration to create different physical geometry as well as optical effects. Some example materials are sapphire, quartz, and any silica-based materials, such as opal, various jades, and many others.

(14) Biologically safe applications.

The bonding materials and the materials resulting from the hydroxide-catalyzed bonding process are chemically inert, and are resistant to water and various edible liquids/fluids, such as various oils, vinegar, etc. The minute amount of applied but unreacted hydroxide from the bonding process is water soluble, and thus can be removed thoroughly by water rinsing. In other words, the bonding is biologically safe and can be used in medical equipment and food industries for making food utensils, containers, etc.

(15) Imprecision applications.

When the bonding material contains ingredients with a high fill factor, such as sand or powder of silica-based or silica-containing materials, the hydroxide-catalyzed bonding technique can be used for imprecision applications. It can be a good substitute for general-purpose glues or epoxies as long as the materials to be bonded either have or can be hydrated to create reasonable surface hydroxyl group density.

In the above description, example applications were mentioned in specific areas and/or for specific purposes separately. It will be apparent that an application can involve more than one aforementioned area and/or purpose. For example, it will be apparent to one skilled in the art that the new bonding technique may be applied to under-water precision optical systems.

It will also be clear to one skilled in the art that the above embodiments may be altered in many ways without departing from the scope of the invention. Accordingly, the scope of the invention should be determined by the following claims and their legal equivalents.

What is claimed is:

1. A method for bonding at least two surfaces together to form a bonded structure, said method comprising the steps of:
   a) supplying a first surface comprising a first surface material, wherein said first surface materialcomprises silicon having a surface oxide layer;
   b) supplying a second surface comprising a second surface material; and
   c) applying a hydroxide source between said first surface and said second surface and bringing said surfaces sufficiently close to each other such that a bond is formed between said first surface and said second surface; thereby forming a bonded structure.

2. The method of claim 1, wherein said first surface material is selected from the group consisting of natural quartz, fused quartz, fused silica, ultra low thermal expansion coefficient glass, borosilicate, opal, granite, silica and silicon-oxide.

3. The method of claim 1, wherein said first surface material and said second surface material comprise materials capable of forming a silicate-like network bond between said first surface and said second surface through hydroxide-catalyzed hydration and dehydration.

4. The method of claim 1, wherein said hydroxide source is an aqueous hydroxide solution.

5. The method of claim 4, wherein said aqueous hydroxide solution comprises an ionic salt selected from the group consisting of sodium hydroxide, potassium hydroxide, ammonium hydroxide, sodium ethoxide and potassium ethoxide.

6. The method of claim 1, further comprising the step of cleaning said first surface.

7. The method of claim 1, further comprising the step of applying a filling powder between said first surface and said second surface, wherein said filling powder is capable of forming a silicate-like network bond between said surfaces through hydroxide-catalyzed hydration and dehydration.

8. The method of claim 7, wherein said filling powder is a silica-based filling powder selected from the group consisting of fused silica, fused quartz or borosilicate.

9. The method of claim 1, wherein said bonding step (c) is performed at room temperature and said bonded structure is subsequently heated.

10. The method of claim 9, wherein said bonded structure is heated by a microwave source.

11. The method of claiin 1, wherein surface bonded hydroxyl groups of said second surface are generated by said application of said hydroxide source.

12. The method of claim 1, wherein said bonded structure is a micro-bonded structure used in one of the fields selected from micro-optics, microelectronics and microstructure fabrication.

13. The method of claim 1, wherein said first surface and said second surface are surfaces of silicon wafers.

14. The method of claim 1, wherein surface bonded hydroxyl groups of said first surface are generated by said application of said hydroxide source.

15. A method for bonding at least two surfaces together to form a bonded structure, said method comprising the steps of:
   a) supplying a first surface comprising a first surface material;
   b) supplying a second surface comprising a second surface material; and
   c) providing an aqueous solution comprising hydroxide ions and a silicate material between first surface and said second and bringing said surfaces sufficiently close to each other; thereby forming said bonded structure.

16. The method of claim 15, wherein said first surface material is capable of forming a silicate-like network, through hydroxide-catalyzed hydration and dehydration.

17. The method of claim 16, wherein said first surface material is selected from the group consisting of natural quartz, fused quartz, fused silica, ultra low thermal expansion coefficient glass, borosilicate, opal, granite, silica-based materials, silica-containing materials, and silicon having a surface oxide layer.

18. The method of claim 15, wherein said first surface material comprises alumina.

19. The method of claim 15, wherein said aqueous hydroxide solution comprises an ionic salt selected from the group consisting of sodium hydroxide, potassium hydroxide, ammonium hydroxide, sodium ethoxide and potassium ethoxide.

20. The method of claim 15, further comprising a step of cleaning said first surface and said second surface prior to step (c).

21. The method of claim 15, wherein said aqueous solution comprises at least two different silicate materials.

22. The method of claim 15, wherein said bonding step (c) is performed at room temperature.

23. The method of claim 15, further comprising the step of applying a filling powder between said first surface and said second surfaces prior to step (c).

24. The method of claim 23, wherein said filling powder is selected from the group consisting of fused silica, fused quartz and borosilicate.

25. The method of claim 15, further comprising the step of heating said bonded structure.

26. The method of claim 25, wherein said step of heating is performed with a microwave source.

27. The method of claim 15, wherein said first surface material is selected from the group consisting of metal elements and semiconductor elements.

28. The method of claim 15, wherein said first surface material is selected from the group consisting of iron, yttrium aluminum garnet, and sapphire.

29. The method of claim 15, wherein said bonded structure is a micro-bonded structure used in one of the fields selected from micro-optics, microelectronics and microstructure fabrication.

30. A method for bonding at least two surfaces together to form a bonded structure, said method comprising the steps of:
   a) supplying a first surface comprising a first surface material, wherein said first surface material comprises alumina;
   b) supplying a second surface comprising a second surface material; and
   c) applying a hydroxide source between said first surface and said second surface and bringing said surfaces sufficiently close to each other such that a bond is formed between said first surface and said second surface; thereby forming a bonded structure.

31. The method of claim 30, wherein said first surface material is selected from the group consisting of yttrium aluminum garnet and sapphire.

32. The method of claim 30, wherein said hydroxide source is an aqueous hydroxide solution.

33. The method of claim 32, wherein said aqueous hydroxide solution comprises an ionic salt selected from the group consisting of sodium hydroxide, potassium hydroxide, ammonium hydroxide, sodium ethoxide and potassium ethoxide.

34. The method of claim 30, further comprising the step of cleaning said first surface.

35. The method of claim 30, firther comprising the step of applying a filling powder between said first surface and second surface, wherein said filling powder is capable of forming a silicate-like network bond between said surfaces through hydroxide-catalyzed hydration and dehydration.

36. The method of claim 35, wherein said filling powder is a silica-based filling powder selected from the group consisting of fused silica, fused quartz or borosilicate.

37. The method of claim 30, wherein said bonding step (c) is performed at room temperature and said bonded structure is subsequently heated.

38. The method of claim 37, wherein said bonded structure is heated by a microwave source.

39. The method of claim 30, wherein surface bonded hydroxyl groups of said first surface are generated by said application of said hydroxide source.

40. The method of claim 30, wherein surface bonded hydroxyl groups of said second surface are generated by said application of said hydroxide source.

41. The method of claim 30, wherein said bonded structure is a micro-bonded structure used in one of the fields selected from micro-optics, microelectronics and micio-structure fabrication.

42. A method for bonding at least two surfaces together to form a bonded structure, said method comprising the steps of:
   a) supplying a first surface comprising a first surface material, wherein said first surface material is selected from the group consisting of semiconductor elements and metal elements;
   b) supplying a second surface comprising a second surface material; and
   c) applying a hydroxide source between said first surface and said second surface and bringing said surfaces sufficiently close to each other such that a bond is formed between said first surface and said second surface; thereby forming a bonded structure.

43. The method of claim 41, wherein said first surface material comprises a ceramic material.

44. The method of claim 41, wherein said first surface material comprises a superconductor.

45. The method of claim 41, wherein said hydroxide source is an aqueous hydroxide solution.

46. The method of claim 45, wherein said aqueous hydroxide solution comprises an ionic salt selected from the group consisting of sodium hydroxide, potassium hydroxide, ammonium hydroxide, sodium ethoxide and potassium ethoxide.

47. The method of claim 42, further comprising the step of cleaning said first surface.

48. The method of claim 42, further comprising the step of applying a filling powder between said first surface and second surface, wherein said filling powder is capable of forming a silicate-like network bond between said surfaces through hydroxide-catalyzed hydration and dehydration.

49. The method of claim 48, wherein said filling powder is a silica-based filling powder selected from the group consisting of fused silica, fused quartz or borosilicate.

50. The method of claim 42, wherein said bonding step (c) is performed at room temperature and said bonded structure is subsequently heated.

51. The method of claim 50, wherein said bonded structure is heated by a microwave source.

52. The method of claim 42, wherein surface bonded hydroxyl groups of said first surface are generated by said application of said hydroxide source.

53. The method of claim 42, wherein additional surface bonded hydroxyl groups of said second surface are generated by said application of said hydroxide source.

54. The method of claim 42, wherein said bonded structure is a micro-bonded structure used in one of the fields selected from micro-optics, microelectronics and micro-structure fabrication.

* * * * *